Figure 9:
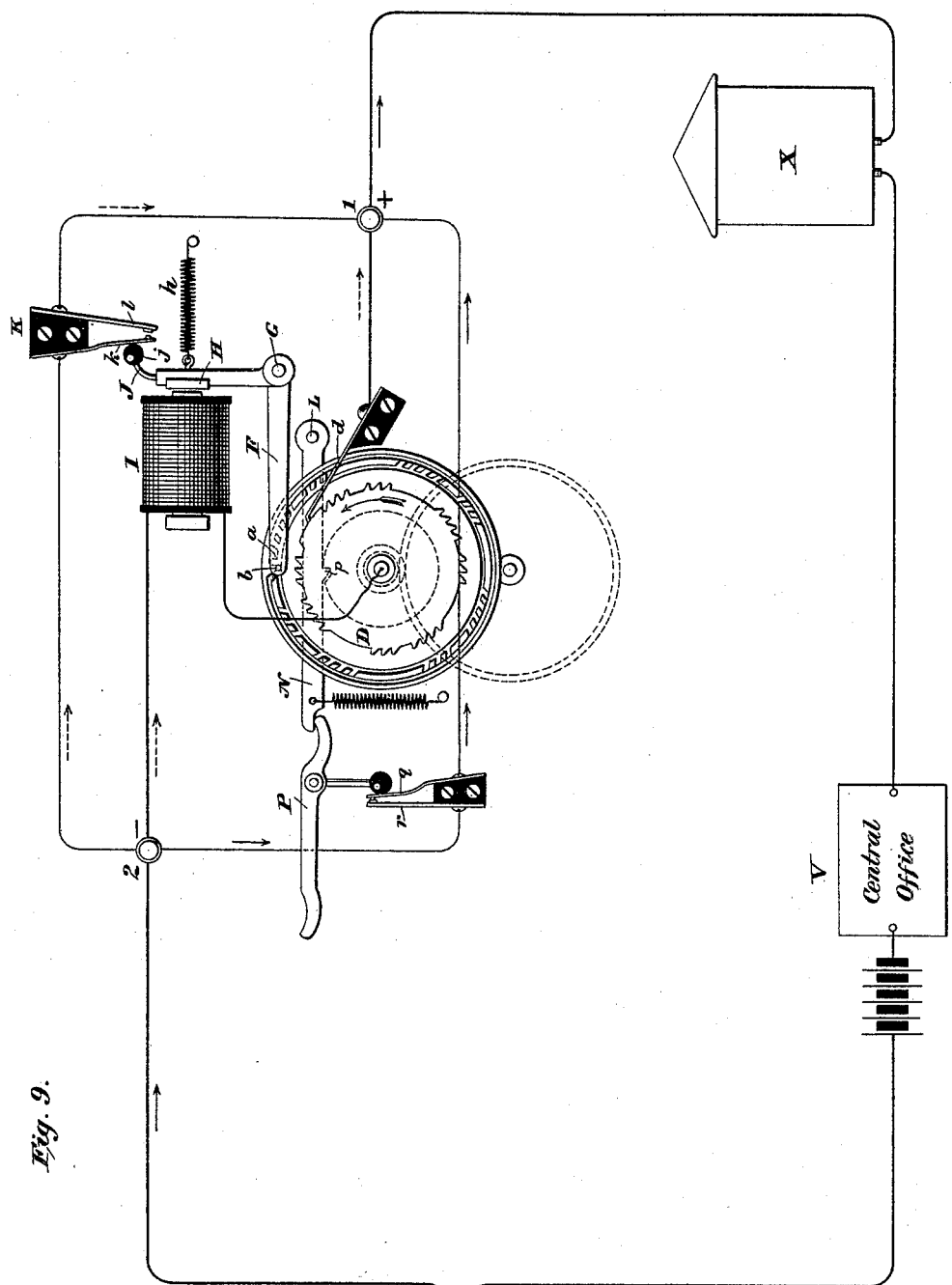

(No Model.) 3 Sheets—Sheet 1.
J. T. STACK.
NON-INTERFERING SIGNAL BOX.
No. 584,297. Patented June 8, 1897.
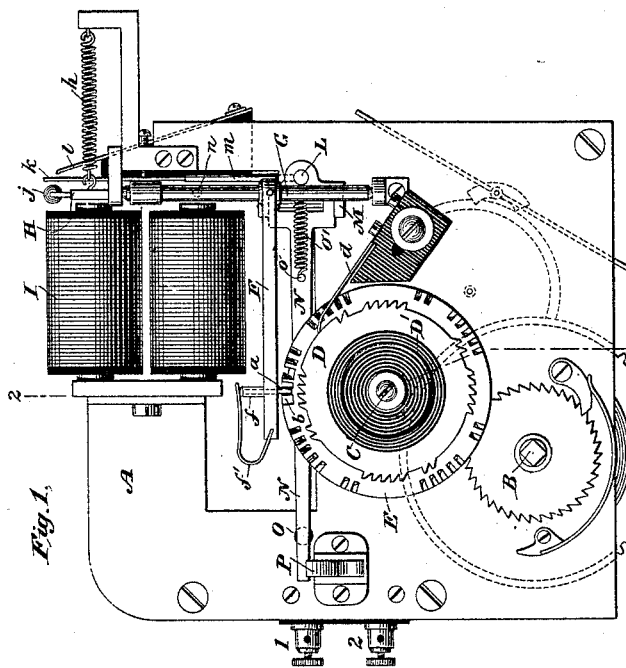
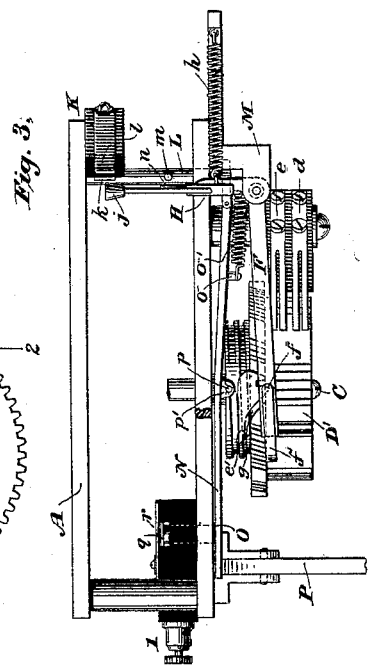
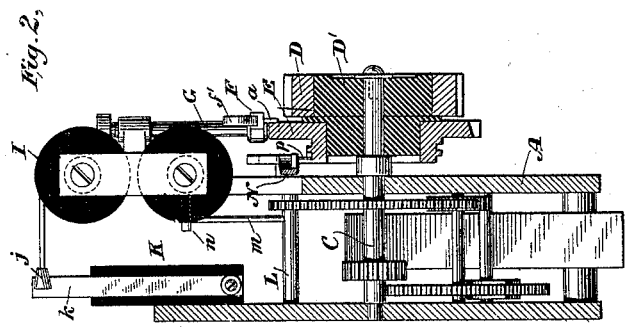
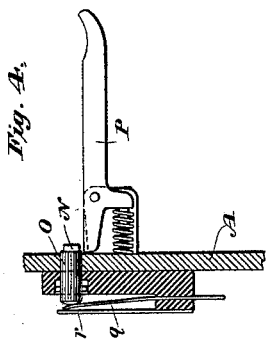
Witnesses
Geo. W. Breck.
Henry W. Lloyd.
Inventor
John T. Stack.
By his Attorneys
Fowler & Fowler.

(No Model.) 3 Sheets—Sheet 2.
J. T. STACK.
NON-INTERFERING SIGNAL BOX.
No. 584,297. Patented June 8, 1897.
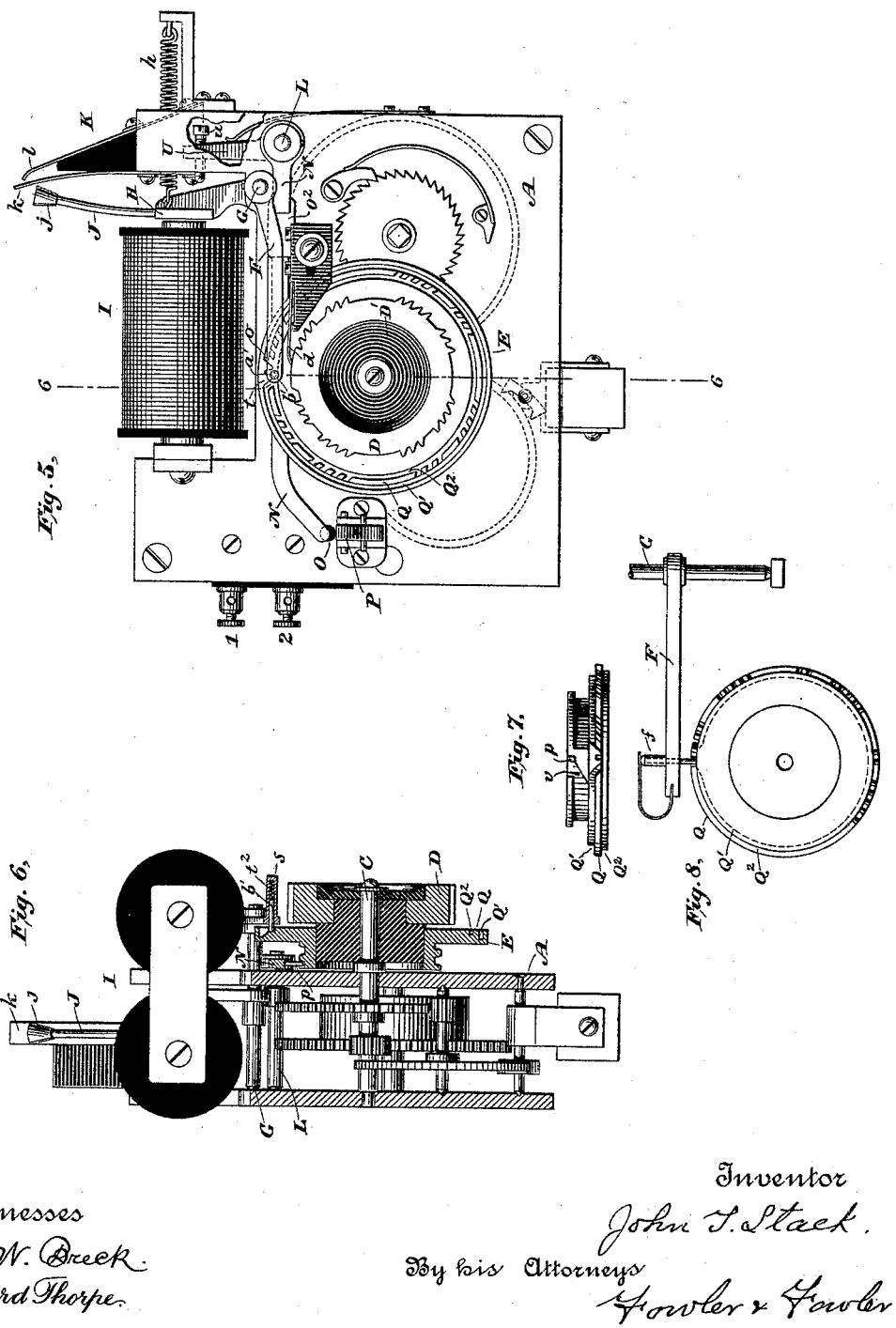
Witnesses
Geo. W. Breck
Edward Thorpe
Inventor
John T. Stack
By his Attorneys
Fowler & Fowler (No Model.) 3 Sheets—Sheet 3.

J. T. STACK.
NON-INTERFERING SIGNAL BOX.

No. 584,297. Patented June 8, 1897.

Witnesses
Geo. W. Breck
Henry W. Lloyd

Inventor
John T. Stack
By his Attorneys
Fowler & Fowler.

UNITED STATES PATENT OFFICE.

JOHN T. STACK, OF CHICAGO, ILLINOIS, ASSIGNOR, BY DIRECT AND MESNE ASSIGNMENTS, TO THE GAMEWELL FIRE-ALARM TELEGRAPH COMPANY, OF NEW YORK, N. Y.

NON-INTERFERING SIGNAL-BOX.

SPECIFICATION forming part of Letters Patent No. 584,297, dated June 8, 1897.

Application filed September 29, 1890. Serial No. 366,442. (No model.)

*To all whom it may concern:*

Be it known that I, JOHN T. STACK, a citizen of the United States, residing at Chicago, county of Cook, State of Illinois, have invented certain new and useful Improvements in Non-Interfering Signal-Boxes, of which the following is such a full, clear, and exact description as will enable any one skilled in the art to which it appertains to make and use the same, reference being had to the accompanying drawings, forming part of this specification.

The object of my invention is to construct a fire-alarm signal-box in such a manner that when it is connected up with other signal-boxes in a fire-telegraph circuit the whole system shall be free from danger of "interference"—that is, I aim to make it possible to operate two or more boxes on the same circuit simultaneously or within a few moments of each other without producing any confusion of signals whatever and without losing the signal of any box that may have been operated. I accomplish this result by means of apparatus which is illustrated in the accompanying drawings, in which—

Figure 1 is a front elevation of a signal-box embodying my invention, showing the form which I have found best adapted to my purpose. Fig. 2 is a vertical cross-section along the line 2 2 in Fig. 1. Fig. 3 is a plan of the box apparatus, some of the parts being removed for the sake of clearness. Fig. 4 is a detail of the starting apparatus, showing also the means by which the box-magnet is normally short-circuited. Fig. 5 is a front elevation of a modified form of apparatus. Fig. 6 is a section along line 6 6 of Fig. 5. Figs. 7 and 8 are detail views, and Fig. 9 shows a diagram of the circuits with some details of the apparatus.

The frame A of my box apparatus supports a train of gearing driven by a spring on a suitable winding-shaft B. On a central shaft C, driven by the said train, is a number-wheel D, which is notched to represent the number "25." Two springs $d$ and $e$ bear normally upon the periphery of this wheel and are electrically connected by it. When a notch on the wheel passes under the springs, the circuit is broken, as will be readily understood. The wheel D has an insulating central portion D', which serves to insulate it from the shaft C. The same shaft carries a metallic wheel E, which is also notched, as shown, and insulated from the shaft. Most of the notches in the wheel E cut entirely through the wheel; but there is a notch at $a$ which simply cuts a short distance into the outer edge of the wheel, and just outside of which normally rests a pin $b$, projecting from an arm or lever F. The said arm or lever is secured to the shaft G, with which the armature H of an electromagnet I is rigidly connected. The arm F accordingly partakes of the motion of the armature of magnet I, and vice versa. When the pin $b$ is on the solid portion of the wheel E just outside the notch, as already described, the armature H is held close to the magnet-poles. The pin $b$ is movable longitudinally within the arm F and within an extension $f$ therefrom and is pressed upon at its outer end by a spring $f'$, which is sprung into the end of the arm and bent over for the purpose indicated.

The notches in the wheel E slope at the bottom, inclining considerably more toward the periphery of the wheel at the inner side thereof—that is, the side next the gearing—than they do on the other side. Now the pin $b$ is made long enough, so that when pressed upon by the spring $f'$ and meeting no resistance it will extend to the lowest portion of the notches. Should, however, the arm F be left free to move inward, say, by the release of the armature H while the pin $b$ is in its normal position, the retracting-spring $h$, acting upon the armature, will have sufficient power to overcome the resistance of the spring $f'$ to the inward motion of the arm, and the pin will pass with the arm inward until it goes behind the edge of the wheel E, after which it cannot be restored until a full revolution of the wheel E has taken place.

By referring to Fig. 3 it will be seen that a flange $e'$ projects from the rear or inner portion of the periphery of the wheel E in such a manner as to form a catch or guide for the pin $b$ when the wheel has nearly completed one revolution. If now the pin stands behind the wheel, the said catch will engage the pin and will force it through the passage shown at g. This will cause the arm F to be moved back to the outer side of the wheel and force the armature H back toward its poles. In case the magnet I is energized at the moment when this happens the pin b will not enter the notch a, but will pass beyond it, as will be presently explained.

Connected with the armature H is an extension J, on the end of which is an insulating-head j. Behind the head are two springs k and l, which are supported on opposite sides of an insulating-block K, and which have extremities that project beyond the block into proximity with each other. Left to themselves the springs k and l do not touch each other, but when the armature H is in its rear position the head j forces them into contact by pressing the spring k against l. Now the springs k and l form the terminals of a shunt around the magnet I and around the signal-wheel D. It is evident that this shunt is closed only when the armature of the magnet I is released. The relations of the parts last described can best be seen by reference to Fig. 9.

In the frame A is a shaft L, from which a pin m projects. The pin m stands just behind a coöperating pin n, which projects from the armature H. The action of the pins is to cause the shaft L to be tilted or partly rotated whenever the armature of the magnet I is thrown back. On the shaft L is pivoted a bracket M in such a manner that when the shaft is partly rotated a movement of the bracket takes place within its end plane. In the bracket is pivoted a lever N, and this has a motion in common with the bracket and also an independent motion toward the front and rear, as shown in Fig. 1. A pin o on the lever is connected to the bracket by a spring o'. The tendency of the spring is to throw the arm N forward or outward. This tendency is under certain conditions resisted by a pin p, which passes downward through a lug p' on the arm or lever N and enters a worm or thread on the hub of the wheel E. The thread is so cut as to carry the lever inward through the medium of the pin as the wheel rotates until it reaches the square end of the worm and catches against it to stop the rotation of the mechanism.

The full action contemplates the drawing out of the lever N by the spring o' as soon as the said lever has been released and bringing it against the back of the wheel at the point where the hub begins and then carrying it back to its original position by means of the worm. When in its original position, the lever N, through the pin p, locks the whole mechanism to prevent it from moving. In this position it is pressed close against the outer surface of the frame A, and its free end acts upon an insulating-piece O and presses it against the spring q, thereby making contact between the said spring and a second spring r, with which the former coöperates. When released by the removal of the lever N, the springs will separate. Under the end of the lever N is a handle P, forming the usual pulling-handle for starting the box. The action will be apparent by reference to Fig. 4. The drawing down of the handle P lifts the lever N, thereby breaking contact between the springs q and r and at the same time mechanically releasing the whole train.

Fig. 9 shows that the springs q and r form the terminals of a shunt around the signaling device and the magnet I. This is the normal box-shunt, such as is usually kept closed by the box-door and opened when the door of the box is opened for signaling. In this instance the pulling of the handle, or, rather, the lifting of the lever N, breaks the normal shunt.

In Figs. 5 and 6 is shown a modification of the structure described in the foregoing, the differences consisting wholly in details which can be readily pointed out. The number-wheel in this instance represents the number "43." The wheel E, as before, is provided with notches, but these notches are not cut through the periphery of the wheel, but through a ring Q, formed by cutting two circular grooves Q' and $Q^2$ in the face of the wheel not far from the outer edge. The outer groove Q', or that nearest the periphery of the wheel, is made deeper than the other, so that the pin b', which corresponds to the pin b, already described, may pass down into the outer groove far enough so that it cannot return until the wheel has made a complete revolution. The pin b' is spring-pressed like the pin b by a spring $t^2$, held within a cap s on the lever F. The pin b' normally rests upon a solid portion of the wheel E just outside a notch a', formed in an angular projection t, which is set in in such a manner as to throw the pin b' into line with the inner groove for a full revolution of the wheel. The function of the piece t is the same as that of the part e'. (Shown in Fig. 3.) The spring which throws the lever N forward in this form of apparatus is shown at $o^2$, being set into the lever N and forming an integral part therewith. The lever is divided for this purpose into two parts. The up-and-down movement of the lever is secured by means of a screw u, passing through a standard U on the shaft L. This screw is in such proximity to the support for the armature H as to be pressed backward by the same when the armature is released, thus lifting the upper end.

I find that I can substitute for the worm illustrated a structure such as is shown in Fig. 7, consisting of a groove which is for the most part straight, but which near its end has a slanting wall, as v, which throws out the pin as before.

The operating parts connected with the wheels D and E are so related that when the rotation of the said wheels brings a notch in the wheel D under the springs d e the pin b (in case it stands upon the outer side of the wheel E) is against a solid portion of the said wheel E, but at other times is opposite a notch in the said wheel, so that it might be moved inward by a backward movement of the armature H. In other words, the notches on the two wheels are positioned with respect to the contact-springs and to the pin b in such a manner that when the wheel D of any given apparatus breaks the circuit it shall be impossible for such rupture of the circuit to release the armature of magnet I, inasmuch as the said armature will be mechanically held through the medium of the pin b, the lever F, the shaft G, and the armature.

The binding-posts are shown at 1 and 2. The box-circuit passes directly from the binding-post 1 to the spring q and from the binding-post 2 to the spring r. When these springs are in contact, a short circuit through them cuts out the rest of the apparatus. The main circuit, however, passes from 2 to the magnet I and thence to the spring e, the wheel D, the spring d, and the binding-post 1. This is the operating-circuit. A second shunt is by way of the springs k and l, passing directly from the binding-post 2 to the former spring and from the binding-post 1 to the latter spring. This shunt is normally open.

Fig. 9 illustrates my invention diagrammatically without being absolutely correct in detail. The central office is indicated at V and engine-houses at X and Y.

The operation of a box is accomplished by pulling the handle P and so releasing the mechanism. By this action the normal box-shunt is broken at the springs q r. The wheels D and E are both set in rotation, and the lever N is pulled over far enough to throw the pin p close to the rear side of the wheel E. The throwing of the lever is accomplished by means of the spring o. The lever is now in a position to be acted upon by the worm as the wheels rotate, and it will finally be caught by the square end of the worm and will then hold the mechanism from further rotation. In doing this it will have been pressed backward, so as to act again upon the insulating-piece O and intermediately upon the spring q, so as to press it against the spring r. Thus the normal box-shunt is automatically closed and the parts are restored to their first condition. Meanwhile the wheel D has been breaking the circuit by means of the notches in such a manner as to have signaled the number "25" four times in succession. Of course this signaling has been accomplished by successive breaks of the circuit, the first breaks being arranged in a group of two and the next in a group of five, and so on. The breaks, however, have not caused the throwing back of the armature, because the latter has been mechanically held in position near the poles whenever the circuit has been broken. This is the usual operation of my signaling apparatus. It might happen, however, that a second box would be pulled at the same time or about the same time as the first, and it becomes necessary to detail the operation of the apparatus under such circumstances. Let us assume, for example, that two boxes, one representing the number "25" and the other representing the number "43," are pulled simultaneously. If the boxes run in perfect unison, the magnets I of the two boxes will be deënergized simultaneously, but owing to the construction above referred to both armatures will be mechanically held from moving away from the magnet-poles. This will be true also during the first part of the second break of the circuit; but it is clear that the second break on the wheel representing the number "25" is made longer than that on the other wheel to indicate the space between the two digits or numerals. Accordingly the armature in box 43 will, before this second break in box 25 shall have been passed, be free to move inward under the influence of the spring h. This it will accordingly do, and in doing so it will close a short circuit between the springs k l, thus cutting out the magnet I of that box. At the same time the pin b or b' will be thrown to the inside of the wheel E or to the outer side of the ring Q, as the case may be, and will there be held, so that it cannot return until a complete revolution has been made. This will hold the armature mechanically away from the magnet-poles and will maintain the short circuit at k l closed. The box 25, however, will continue to operate the circuit by successive openings thereof and will send in its signal without obstruction or interference. Taking the construction shown in Figs. 1, 2, 3, and 4 as a standard, box 25 will be brought to rest in the same manner as has been indicated above in the paragraph describing the action of the apparatus when only one box was operated—that is to say, the pin p will engage with the end of the worm apparatus and stop the rotation at a point where the pin b is resting on a solid portion of the wheel E just outside the notch a.

Now the action which takes place in box 43 is as follows: The backward movement of the armature in this box acts through the pins m n and the shaft L to swing the bracket M and the lever N upward, so that they escape the worm and are not affected thereby. However, the wheel E travels outside the pin b, which cannot return until it has caught in the passage g between the extension e' and the wheel. It then is forced outward and brought to its first position. Meanwhile the other box has completed its signal and the springs d e in the said other box are resting upon the long tooth where they originally rested. Accordingly the line-circuit is completed, and since the normal shunt in box 43 has not been closed again the magnet I in that box will be energized and will hold its armature so close that the pin b will not pass into the notch a, but will allow the wheel to continue its rotation. This it will do and send in its signal after the other box has got through.

If it should so happen that a third box was breaking the circuit at the moment when the pin *b* was restored to its first position, as above detailed, then the said pin would drop into the notch *a* and hold the mechanism. On the closure of the circuit again, however, at the distant box the magnet will be again energized and will release the mechanism again, whereupon the box in question or the distant box will, according to circumstances, gain control of the circuit. To explain this, it should be stated that the throwing back of the pin *b* to its original position (and of course the parts connected with the pin *b*) moves forward the armature and breaks the short circuit at *k l*. Nor does the short circuit form itself again when the pin *b* falls into the notch *a*. For this reason the magnet I can become energized and withdraw the pin *b* from the notch *a* whenever the circuit is closed. At the moment when the pin is in the notch the mechanism is not held mechanically by the pin *p*, so that a release accomplished by the moving of the pin *b* from the notch *a* will serve as a complete release for the mechanism. This feature becomes of special importance when it is considered that in case a box is pulled when the line is broken or otherwise defective the pin *b* will immediately drop into the notch *a*. Of course no signal will be sent in until the line is restored, but when that happens the box will immediately begin to rotate and send in the stored signal. In other apparatus of this class the operation of a box under such circumstances— that is, when the line is broken—would result in the complete running down of the box. The latter would then be in no condition to send in a signal on the restoration of the circuit. With my apparatus there is no danger of the signaling mechanism being put into an inoperative condition from such cause.

Incidentally it may be stated that if a box is started at the moment when another box is breaking the circuit or has broken it the first-named box will be caught momentarily by the pin *b* entering the notch *a*; but it will be immediately released as soon as the other box makes the circuit again. If a box is started at a moment when another box is holding the circuit closed, then the said first-named box will not be held at all, but will rotate as already described.

It does not matter how many boxes are started at or near the same moment the result will be the same—that is, one box will send in its signal first, and then another, and then another, to the end.

Having described my invention, I claim—

1. In a signaling apparatus, a number-wheel and a second wheel controlling a short circuit around the said number-wheel, the said second wheel being provided with notches which correspond in number and arrangement to the signaling elements of the said number-wheel, in combination with a lever having a pin or projection adapted to move in one direction through the said notches, but which cannot normally move through the same in the reverse direction, and a catch or guide which forces the said pin through in the reverse direction at a predetermined point in the wheel's revolution, thus breaking the short circuit, and an extra notch into which the said pin can pass but not far enough to restore the short circuit, as and for the purpose set forth.

2. In a non-interference signal-box, an actuating-train, a number-wheel actuated thereby, a non-interference magnet and its armature, and two short circuits around the entire box mechanism, one short circuit normally open but adapted to be closed by the armature in retracting and held so closed positively by the train in running for a predetermined interval, the other short circuit normally closed but adapted to be opened when the box is started and thereafter closed by the train in completing its running, but held positively open by the armature as long as it is retracted.

3. In a non-interference signal-box, an actuating-train, a number-wheel, a non-interference magnet and its armature, and two short circuits for both number-wheel and magnet, one adapted to be closed by the armature in retracting and positively reopened after a predetermined interval by the train in running, the other adapted to be closed by the train at the conclusion of the signal, but held positively open by the armature as long as it is retracted.

4. In a non-interference signal-box, an actuating-train, a number-wheel, a non-interference magnet and its armature, and two short circuits for both number-wheel and magnet, one adapted to be closed by the armature in retracting and positively reopened by the train in running, the other adapted to be closed by the train in running, but held positively against closure by the armature while it is retracted.

5. In a non-interference signal-box, an actuating-train, a number-wheel, a non-interference magnet and its armature, and two short circuits for both number-wheel and magnet, one closed by the armature in retracting but positively reopened by the train in running, the other adapted to be closed by the train in running but held out of control of the train by the armature while retracted, and an intermediate connection between the train and armature adapted after a predetermined time of running to mechanically restore the armature and thereby allow the second short circuit to be closed.

6. In a non-interference signal-box, an actuating-train, a number-wheel actuated thereby, a non-interference magnet and its armature, a short circuit for both magnet and number-wheel, and a lever normally holding said short circuit closed but adapted to be moved to open the short circuit when the box is started, a connection between the train and lever whereby the latter is continually moved back to close the short circuit by the train in running, and a connection between the lever and the armature whereby the lever is removed from the control of the train as long as the armature is retracted.

7. In a non-interference signal-box, an actuating-train, a number-wheel actuated thereby, a non-interference magnet and its armature, a short circuit around the entire apparatus, and a lever pivoted to move in two planes, and adapted to be moved in one plane by the actuating-train to close the short circuit, and to be moved in the other plane by the armature in retracting to thereby escape the control of the actuating-train.

8. In a non-interference signal-box, an actuating-train, a number-wheel, a non-interference magnet and its armature, a short circuit around the entire apparatus, a lever adapted to be moved to close the short circuit, a cam on the train engaging with the lever to so move it, and an arm on the lever acted on by the armature to lift the lever away from the cam when the armature is retracted.

9. In a non-interference signal-box, an actuating-train, a number-wheel, a non-interference magnet and its armature, a detent-lever connected to said armature, a short circuit around the apparatus adapted to be closed by the train in running but held open by the armature while it is retracted, and a trap connected with the number-wheel and adapted to restore the detent-lever and thereby the armature after a predetermined time of running, whereby the short circuit is closed and the train stopped.

10. In a non-interference signal-box, the actuating-train, the number-wheel, the non-interference magnet and its armature, the pivoted bracket M, the arm $m$, the pivoted lever N, and the cam or worm carried by the train to actuate the same.

11. In a non-interference signal-box, an actuating-train, a number-wheel, a non-interference magnet and its armature, a shaft carrying an arm, as $m$, extending into position to be actuated by the armature, and a bracket, as M, a lever, as N, pivoted to the bracket, and extending into juxtaposition with a shaft of the actuating-train, a cam carried by said shaft and normally engaging said lever, and a short-circuiting switch in position to be operated by said lever when moved to its ultimate position.

12. In a non-interference signal-box, an actuating-train, a number-wheel, a non-interference magnet and its armature, a shaft carrying an arm extending into operative relation with the armature; a bracket rigidly attached to the shaft, a lever pivoted on the bracket and extending over a shaft of the actuating-train, a cam on said shaft normally engaging said lever, a short-circuiting switch in position to be operated by said lever when moved by the cam, and means carried by the train to positively restore the armature after a predetermined time of running.

In testimony whereof I have hereunto set my hand, this 30th day of August, 1890, in the presence of the two subscribing witnesses.

JOHN T. STACK.

Witnesses:
J. H. HARRISON,
HENRY S. DIETRICH.